United States Patent
Manion et al.

(10) Patent No.: US 7,454,465 B2
(45) Date of Patent: Nov. 18, 2008

(54) REAL-TIME COLLABORATION AND COMMUNICATION IN A PEER-TO-PEER NETWORKING INFRASTRUCTURE

(75) Inventors: Todd R. Manion, Redmond, WA (US); Ravi T. Rao, Redmond, WA (US); Michael E. Shappell, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1133 days.

(21) Appl. No.: 10/810,381

(22) Filed: Mar. 26, 2004

(65) Prior Publication Data

US 2005/0216556 A1    Sep. 29, 2005

(51) Int. Cl.
*G06F 15/16* (2006.01)
*G06F 12/00* (2006.01)

(52) U.S. Cl. .............. 709/204; 709/205; 709/217; 709/250

(58) Field of Classification Search ............ 709/204, 709/205, 217, 250; 719/313, 330
See application file for complete search history.

(56) References Cited

U.S. PATENT DOCUMENTS

| | | | |
|---|---|---|---|
| 5,944,794 A | 8/1999 | Okamoto et al. | |
| 5,987,376 A | 11/1999 | Olson et al. | |
| 6,470,375 B1 | 10/2002 | Whitner et al. | |
| 6,675,261 B2 | 1/2004 | Shandony | |
| 6,823,327 B1 | 11/2004 | Klug et al. | |
| 6,981,043 B2 | 12/2005 | Botz et al. | |
| 2002/0188657 A1 | 12/2002 | Traversat et al. | |
| 2002/0191018 A1* | 12/2002 | Broussard | 345/746 |
| 2004/0064693 A1 | 4/2004 | Pabla et al. | |
| 2004/0133640 A1 | 7/2004 | Yeager et al. | |
| 2004/0205243 A1 | 10/2004 | Hurvig et al. | |
| 2004/0221043 A1* | 11/2004 | Su et al. | 709/227 |
| 2004/0260761 A1* | 12/2004 | Leaute et al. | 709/201 |
| 2004/0264385 A1* | 12/2004 | Hennessey et al. | 370/252 |
| 2005/0060432 A1* | 3/2005 | Husain et al. | 709/246 |
| 2005/0086300 A1 | 4/2005 | Yeager et al. | |

OTHER PUBLICATIONS

Adam Langley, *The Freenet Protocol*, The Free Network Project, at http://freenet.sourceforge.net/index.php?page=protocol (last visited May 21, 2001).

Rowstron, Antony, and Peter Druschel, *Pastry: Scalable, distributed object location and routing for large-scale peer-to-peer systems*, at Microsoft Research, Ltd., St. George House and Rice University, 20 pages, Jan. 2001.

(Continued)

*Primary Examiner*—Zarni Maung
(74) *Attorney, Agent, or Firm*—Marshall, Gerstein & Borun LLP

(57) ABSTRACT

Methods that enable real-time communication and collaboration in a peer-to-peer (P2P) network are provided. More specifically, methods for the creation and access of an underlying graph and/or group structure to pass collaboration/real-time communication data and other functions such as the retrieval of node/member and graph/group information, the addition, modification, deletion and management of records (data), the direct communication between graph/group nodes/members, the registering for event notifications, and other functions are used to pass real-time communication/collaboration data between nodes in a graph or members of a group.

44 Claims, 4 Drawing Sheets

OTHER PUBLICATIONS

Druschel, Peter, and Antony Rowstron, *Past: A large-scale, persistent peer-to-peer storage utility*, at Rice University and Microsoft Research, 6 pages, Nov. 2001.

Rowstron, Antony, and Peter Druschel, *Storage management and caching in Past, a large-scale, persistent peer-to-peer storage utility*, at Microsoft Research, Ltd., St. George House and Rice University, 14 pages, Jan. 2001.

Rowstron, Antony, Anne-Marie Kermarrec, Peter Druschel, and Miguel Castro, *Scribe: The design of large-scale event notification infrastructure*, at Microsoft Research, Ltd., St. George House and Rice University, 20 pages, Jan. 2001.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord, Jan. 2001.

U.S. Appl. No. 10/351,905, filed Jan. 27, 2003, Manion et al.

U.S. Appl. No. 10/309,865, filed Dec. 4, 2002, Manion et al.

Ellison, C., SPKI Requirements, (The Internet Society 1999), at http://www.ietf.org/rfc/rfc2692.txt?number=2692 (Aug. 6, 2001).

Lai, K. et al., Measurung Link Bandwidths Using a Deterministic Model of Packet Delay, at Department of Computer Science at Stanford University, 13 pages, Apr. 4, 2004.

Red-Black Tree, National Institute of Standards and Technology, at http://www.nist.gov/dads/HTML/redblack.html (Mar. 5, 2002).

Erdelsky, P., The Birthday Paradox, EFG, at http://www.efgh.com/math/birthday.htm (Mar. 8, 2002).

Ellison, C., et al., SPKI Certificate Theory, (The Internet Society 1999), at http://www.ietf.org/rfc/rfc2693.txt?number=2693 (Aug. 6, 2001).

Ellison, C., et al., Simple Public Key Certificate, (Internet Draft 1999), at http://www.world.std.com/~cme/spki.txt (Aug. 6, 2001).

Microsoft Corporation, "Introduction to Windows Peer-to-Peer Networking," Jan. 2003.

\* cited by examiner

REAL-TIME COLLABORATION AND COMMUNICATION IN A PEER-TO-PEER NETWORKING INFRASTRUCTURE

FIELD OF THE INVENTION

This invention relates generally to peer-to-peer networking collaboration and real-time communication and, more particularly to application programming interfaces and methods for the creation of peer-to-peer collaborations and real-time communication using records in a peer-to-peer graph or a peer-to-peer group.

BACKGROUND OF THE INVENTION

Despite the technological advances realized in recent years, many traditional business activities still have a prominent place in today's workplaces. One such activity is the meeting or conference. Often, such a collaborative effort will involve a presentation of material by one participant to a number of other participants. Traditional means for presenting information include projection on a screen, display on a monitor or other optically active device, or presentation in hard copy form, such as on a white board, chalkboard or easel. While each of these methods has benefits and drawbacks in terms of cost, complexity, and effectiveness, projection and display are typically best suited for rapidly changing data such as may be presented via slides or video.

In recent years, various communication technologies on the Internet have been created that allow users with common interest to collaborate, share files, and "chat" with one another. Currently, however, most communication on the Internet takes place in a server centric environment whereby all communication flows to or through large central servers to which individuals may connect to join and participate in such communication.

With the reemergence of peer-to-peer technology, the current server centric model of Internet communication is quickly being replaced. Indeed, peer-to-peer technologies enable users to contact one another in a serverless environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, joining, and sharing information real-time in a group peer-to-peer environment is not well established. However, individuals have grown accustomed to the benefits provided by such grouping technology in the server centric environment.

BRIEF SUMMARY OF THE INVENTION

The present invention provides a method to establish, join, and share information collaboratively and communicate real-time to other members of a peer-to-peer group or graph. A peer-to-peer graph allows applications to pass data between peers efficiently and reliably. A peer-to-peer group provides the capability to pass data of multiple graphs between peers efficiently and reliably.

In one embodiment of the present invention, an API and method are exposed to allow applications to establish peer-to-peer collaborations such as whiteboards and the like to be established in a graph or group such that each node in the graph or group has a consistent view of the data in the graph. A node represents a particular instance of an individual on the network. Data is sent between nodes in the form of records. Records are essentially pieces of data flooded (sent) to all nodes in a graph where the data is the text being written in real-time communications, the co-ordinate locations of mouse (e.g., pen) movement of a whiteboard and the like. Once a node has received a record, the node places the record in a database or data store. The application retrieves the record and processes the data.

In one embodiment of the present invention, application programming interfaces (APIs) are provided that provide creation and access to a collaboration or real-time event. These APIs create a new event in the form of a graph, open an existing graph for connection, open a specific port listening for connections, initiate a connection to a listening port at the specified IP address, allow a user to specify the security provider for the graph, add a collaboration event (e.g., a whiteboard) or communication event in the form of a record to the graph, update an event in the graph, and delete an event from the graph. Each of these interfaces utilizes various parameters that are passed in from an application program that uses these interfaces to manage the events that utilize graphs. The interfaces return a value that indicates the success or failure of the function. For failures, the interfaces provide an indication as to the problem resulting in the failure.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
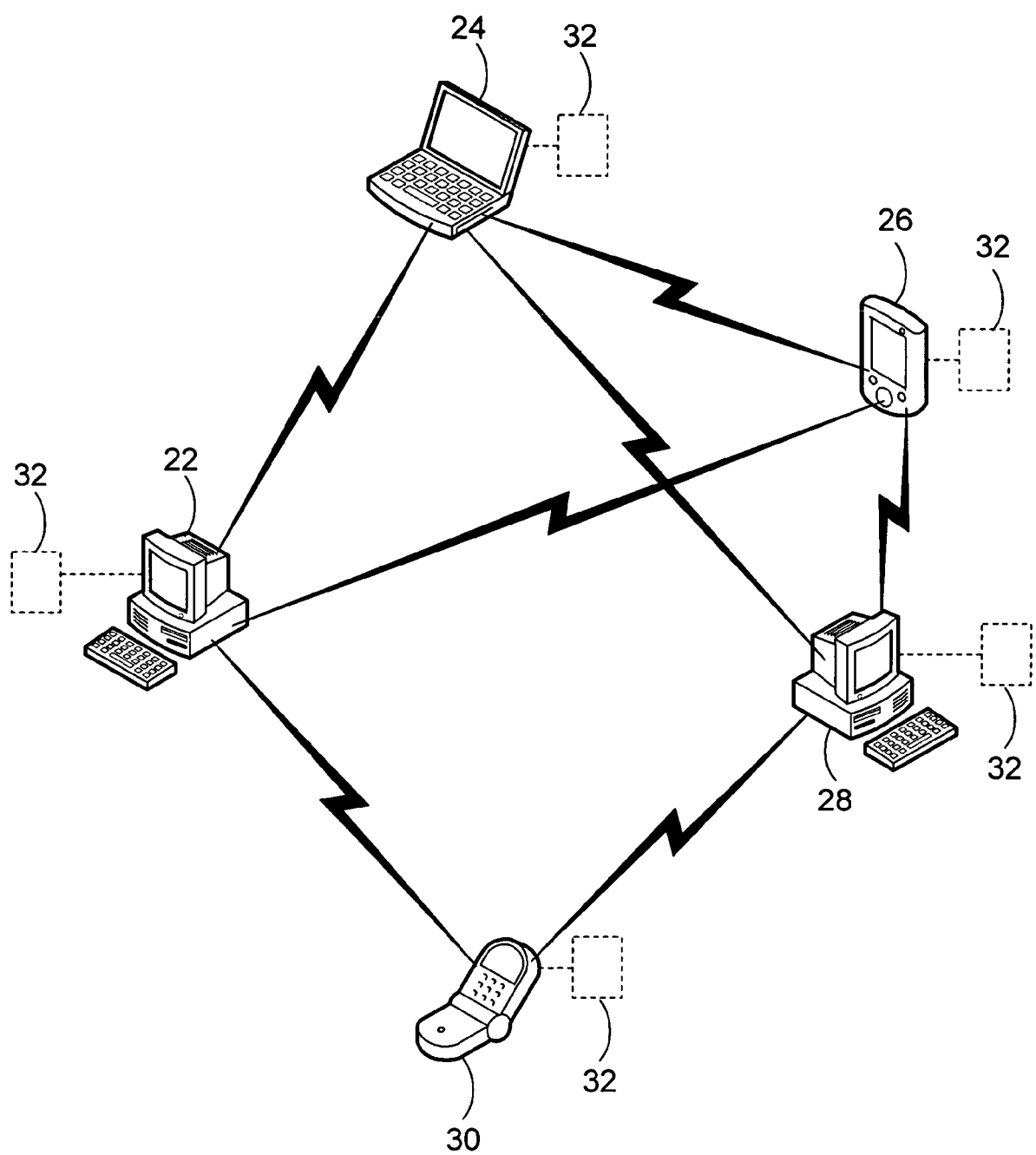
FIG. 1 is a block diagram generally illustrating an exemplary environment in which the present invention operates.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of an operating environment 20 in which the invention may operate. In the environment 20, nodes 22-30 are in communication with each other in either a graph or a group. A graph is a set of tightly coupled nodes that are able to communicate with each other and can send data to other nodes. The nodes can be geographically diverse, ranging from a local-link to a global link. A group can be thought of as a secure implementation of a graph in that a security provider is provided within the group. The group utilizes an authentication scheme similar to a distributed domain/certificate authority that authenticates individuals into the group based upon some root certificate generated by the creator of the group. If an intermediate hop between nodes is not in the underlying security structure, information flowing through the intermediary hop is encrypted. Multiple graphs can be simultaneously set up in a group.

Associated with each node is a data table 32. Information is added to the data table 32 in the form of a record. Records are propagated to each node 22-30 in the graph. For example, if node 22 adds a record, the record is sent to the other nodes 24-30. Nodes receive notification of incoming records through an event notification. Further details of the event notification and record propagation can be found in U.S. patent application Ser. No. 10/309,865, entitled "Peer-to peer graphing interfaces and methods" and Ser. No. 10/351,905, entitled "Peer-to peer grouping interfaces and methods," both assigned to the same assignee of the instant application, the teachings and disclosure of which are hereby incorporated by reference in their entireties.

Figure 2:
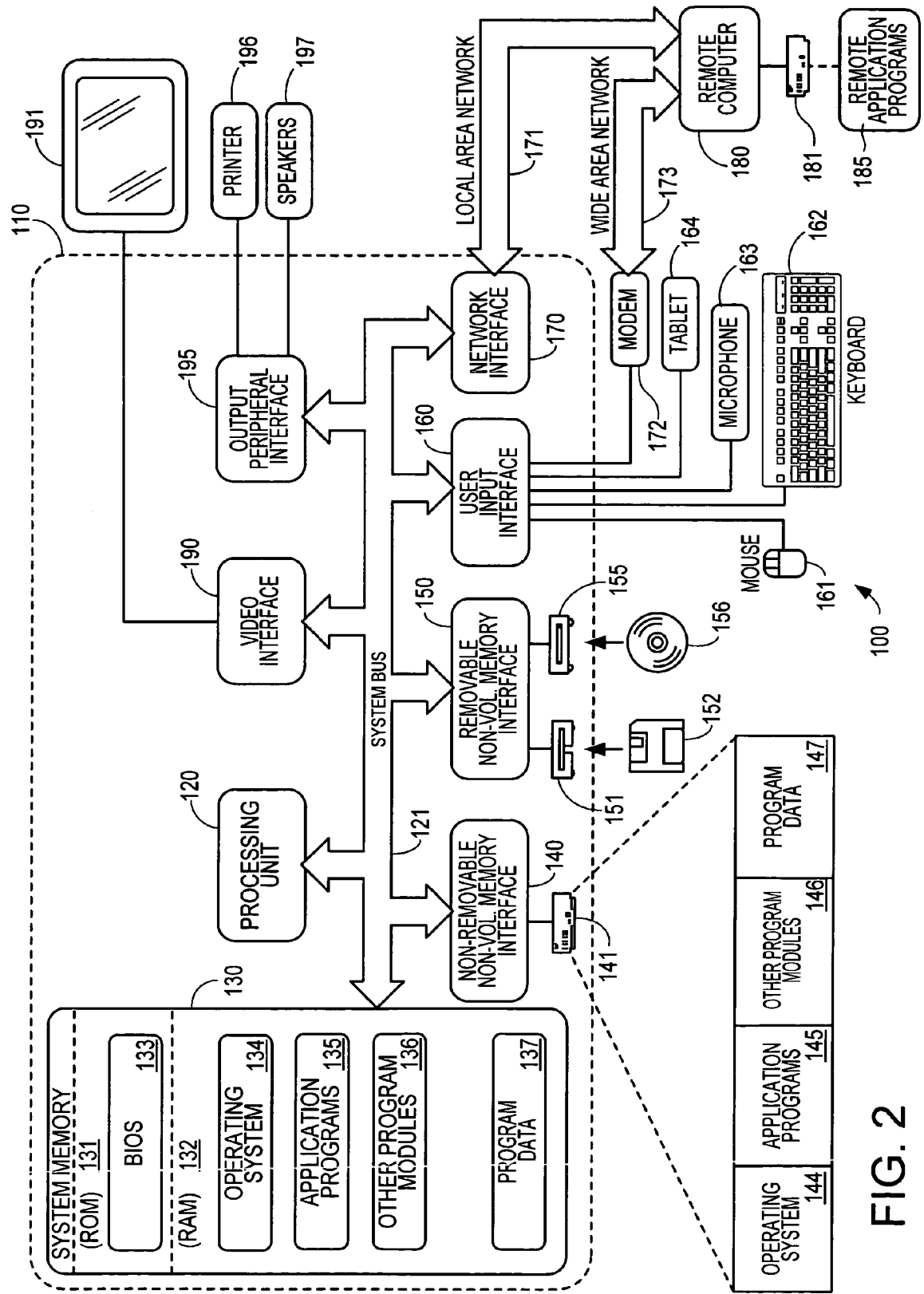
FIG. 2 is a block diagram generally illustrating an exemplary computer system on which the present invention resides.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
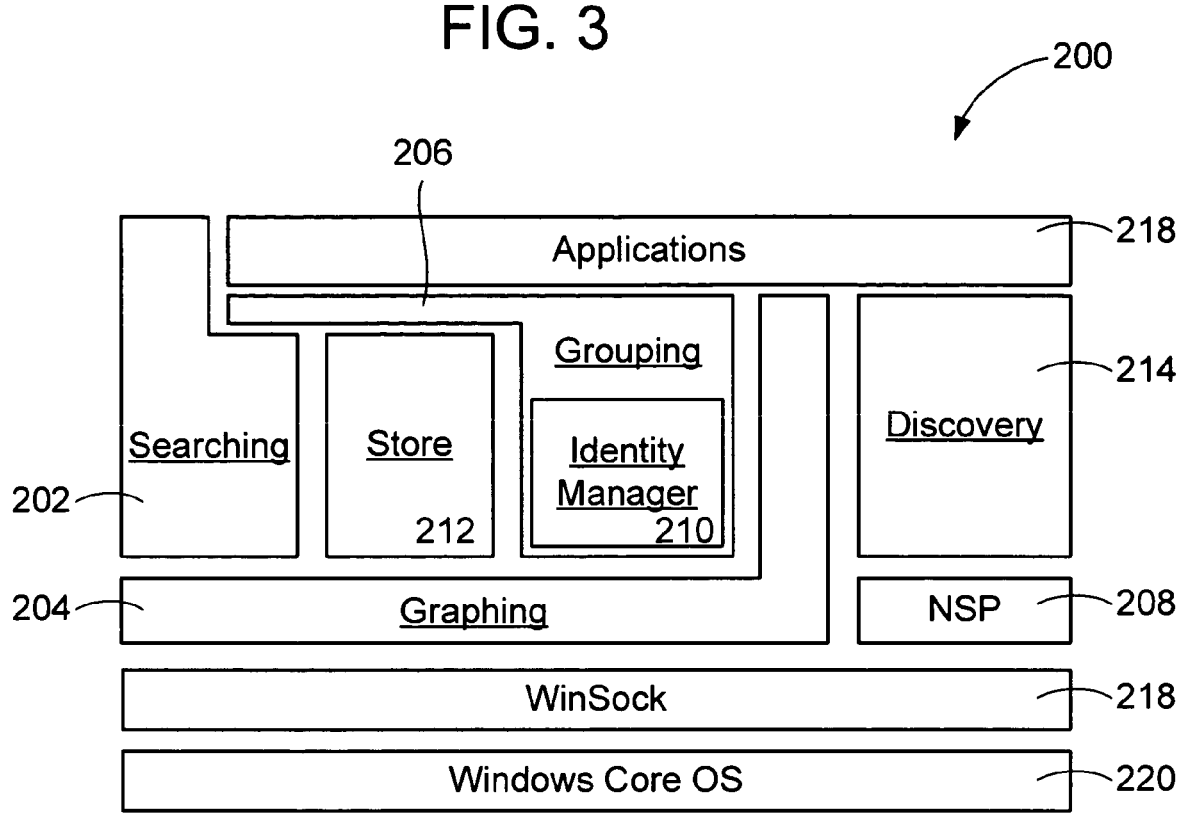
FIG. 3 is a simplified framework diagram illustrating a peer-to-peer (P2P) interface framework into which the system and methods of the present invention find particular applicability.

FIG. 3 illustrates the underlying architecture 200 of the peer-to-peer architecture the invention uses. The architecture 200 consists of a searching component 202, a graphing component 204, a grouping component 206, a name service provider (NSP) 208, an identity manager 201, a store 212, and a discovery component 214. Applications 216 communicate with the components 202-214. Winsock 218 and the Windows core operating system 220 provide the transport over which the peer-to-peer networking operates.

The searching component 202 provides a mechanism for locating data within the group. There are two different search models, the local search and the distributed search. A local search searches the store 212, which contains the set of local records for the group. In a local search, a group member does not send search queries to other group members. A distributed search sends queries to group members.

The graphing component 204 is responsible for maintaining a set of connected nodes and providing flooding and replication of data across the graph. The grouping component 206 is the security layer provided on top of a graph. The security layer defines the security model behind group creation, invitation, and connection to the group. The NSP component 208 provides a mechanism to access an arbitrary name service provider. The identity manager 210 enables the creation and management of peer-to-peer identities. The store 212 is the set of records associated with a graph. The store represents the view of the graph and/or group data, which should be the same for all nodes in a particular graph or group. When a new member joins, they automatically receive all the records for the graph (or group) from the current member to which they attach. After the initial synchronization, members periodically resynchronize their replicated stores to ensure that all members consistently have the same view. The discovery component 214 provides peer-to-peer name resolution and discovery of other peers within the peer-to-peer network.

Now that the overall environment has been described, the process to perform collaboration and real-time communication will be described. An example of such collaboration and real-time communication is as follows: A user residing in England realizes her husband's 50$^{th}$ birthday is coming up. The user observes a friend is online and at home in the United States, and starts chatting with him using the teachings of the present invention. They decide that they would give the user's husband a "hand drawn" birthday card. After all the relevant family members are in the same session, the user starts a whiteboard activity that starts up on everyone's machine. The user starts drawing and other members start coloring the drawing itself. Other scenarios include gaming, document collaboration (such as editing documents, commenting on documents, etc.), on-line presentations, and the like.

In the description that follows, a whiteboard scenario shall be used to describe the process. The same steps are used in the other scenarios. In the description, node 22 shall be used as the creator of the whiteboard. The whiteboard is created as a graph. The graph may be an isolated graph or a graph that is in a group. The functions that node 22 uses to create a whiteboard in a graph are PeerGraphCreate and PeerGraphListen. The PeerGraphCreate function creates a new peer-to-peer graph. An application can specify information about a peer-to-peer graph and the type of security that a peer-to-peer graph uses. One of the parameters specified is the name of the graph. Node 22 can also specify a security provider if the node wants the graph to be limited to invited members. A handle to a peer-to-peer graph is returned. The PeerGraphListen function indicates that a peer-to-peer graph should start listening for incoming connections.

Nodes 24-30 receive the name of the graph out-of-band of the graph from node 22. For example, the name could be sent over a phone line, via an e-mail, etc. Nodes 24-30 connect to the graph using PeerGraphOpen and PeerGraphConnect functions. Once connected the nodes 24-30 also use the PeerGraphListen function to start listening for incoming connections. The PeerGraphOpen function opens a peer-to-peer graph that is created previously by either the node or a remote node. A handle to the peer-to-peer graph is returned. The PeerGraphConnect function attempts to make a connection to a specified node in the peer-to-peer graph.

Once connected, the nodes register for events of interest using the PeerGraphRegisterEvent function. The nodes sign up for events such as notifications that a record type or a specific record has been changed, notifications that data has been received, notifications that a specific record type has been synchronized, and notifications that the graph's status has changed (e.g., the node has synchronized with the graph) in order to collaborate or communicate in real-time.

Figure 4A:
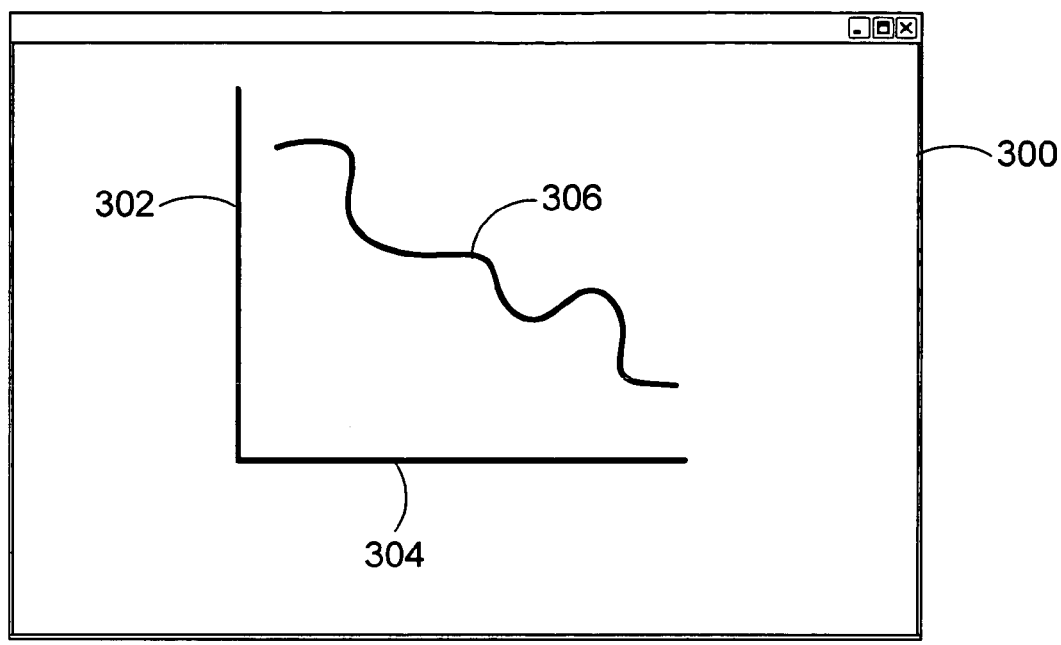
FIG. 4a is an illustration of a whiteboard using the teachings of the present invention.
Figure 4B:
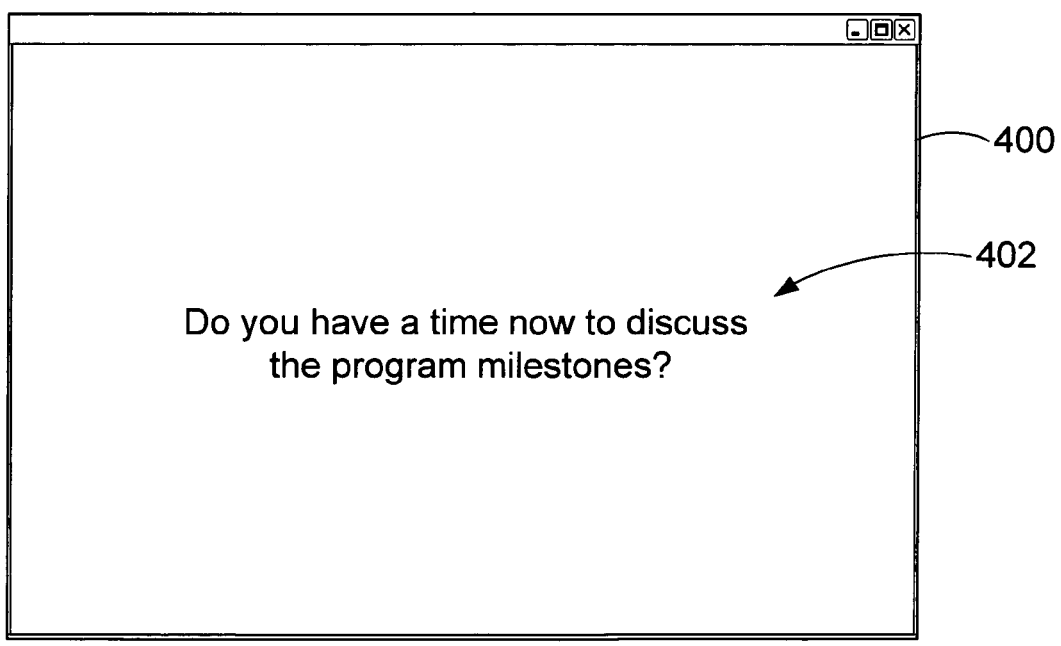
FIG. 4b is an illustration of a real-time chat session using the teachings of the present invention.

As previously indicated, nodes send data to each other in the form of records. Applications such as a whiteboard application capture data and package the data into a record. For a new whiteboard "page," a new record is allocated. For example, FIG. 4a shows a graph in a whiteboard application. An application 216 tracks movement on the whiteboard (e.g., lines 302, 304, 306) and sends the movement data in a record to other nodes. FIG. 4b illustrates a real-time chat window where an application 216 captures the text 402 and sends the text in a record to other nodes.

Applications use the PeerGraphAddRecord function to add a new record to the peer-to-peer graph. The captured data (e.g., lines 302, 304, 306, text 402) is placed in the data field of the record. A record added with this function is then flooded to the other nodes in the peer-to-peer graph. The PeerGraphGetRecord function is called to retrieve the specific record. In one embodiment, only the graph creator can add a record to the graph.

Data in a graph can be deleted in one of two ways. The first way is to delete the record containing the data. Applications use PeerGraphDeleteRecord to delete the record containing the data. The second way, which is also used to remove portions of data in a record, is to specify that data of the "opposite type" (e.g., a line having the whiteboard background color, text with a color that is the background color, etc.). Once a collaboration session or real-time communication session is finished, the graph is closed. The PeerGraphClose function is used to close the graph.

Creating a collaboration event or real-time communication event in a group involves calls to similar functions. The PeerGraphOpen, PeerGraphConnect, PeerGraphRegisterEvent, PeerGraphAddRecord, PeerGraphGetRecord, PeerGraphDeleteRecord, and PeerGraphClose functions correspond to PeerGroupOpen, PeerGroupConnect, PeerGroupRegisterEvent, PeerGroupAddRecord, PeerGroupGetRecord, PeerGroupDeleteRecord, and PeerGroupClose functions respectively.

If a group hasn't been created, the group creator (e.g., node 22) calls a PeerGroupCreate function to create a new group. The creator sends certificates out-of-band to other nodes. Each of the other nodes call PeerGroupIdentityGetInfo that returns a description of the node that is needed for a node to be invited into a group and this information is passed to the creator out-of-band. A node uses the information to invite another node into the group using the PeerGroupCreateInvitation function. This function returns a string that is used by the other node to join the group. The inviting node sends this string out-of-band to the other node. The other node joins the group by calling the PeerGroupJoin function and specifies the string received from the inviting node.

Once a node has joined a group, the node connects to the group using the PeerGroupConnect function. Once connected, the node can communicate with other nodes. The PeerGroupOpen, PeerGroupRegisterEvent, PeerGroupAddRecord, PeerGroupGetRecord, PeerGroupDeleteRecord, and PeerGroupClose functions perform the same functions as described above for the PeerGraphOpen, PeerGraphRegisterEvent, PeerGraphAddRecord, PeerGraphGetRecord, PeerGraphDeleteRecord, and PeerGraphClose functions for a group.

In one embodiment of the interfaces and methods of the present invention that is particularly well suited for the Microsoft Windows XP operating system, the functions may be as follows:

```
HRESULT WINAPI PeerGraphCreate(
    IN PPEER_GRAPH_PROPERTIES pGraphProperties,
    IN PCWSTR    pwzDatabaseName,
    IN PPEER_SECURITY_INTERFACE pSecurityInterface,
    OUT PHGRAPH  phGraph);
``` where pGraphProperties specifies all of the properties of a peer-to-peer graph, pwzDatabaseName specifies the name of a record database to associate with a peer-to-peer graph when it is created, pSecurityInterface specifies the information about a security provider, and phGraph receives a handle to the peer-to-peer graph that is created.

```
HRESULT WINAPI PeerGraphOpen(
    IN PCWSTR    pwzGraphId,
    IN PCWSTR    pwzPeerId,
    IN PCWSTR    pwzDatabaseName,
    IN PPEER_SECURITY_INTERFACE pSecurityInterface,
```

```
    IN ULONG        cRecordTypeSyncPrecedence,
    IN GUID *       pRecordTypeSyncPrecedence,
    OUT PHGRAPH     phGraph);
``` where pwzGraphId specifies the ID of the peer-to-peer graph to open, pwzPeerId specifies the unique ID of the peer opening the graph, pwzDatabaseName specifies the name of the database that is associated with this peer-to-peer graph at the time the graph was created or opened for the first time, pSecurityInterface specifies the security provider for a peer-to-peer graph, cRecordTypeSyncPrecedence specifies the number of record types in the pRecordTypeSyncPrecedence parameter, pRecordTypeSyncPrecedence points to an array of record types. This array specifies the order in which records of the specified record types are synchronized, phGraph receives a handle to the peer-to-peer graph that is opened.

```
    HRESULT WINAPI PeerGraphListen(
        IN HGRAPH   hGraph,
        IN DWORD    dwScope,
        IN DWORD    dwScopeId,
        IN WORD     wPort);
``` where hGraph specifies the peer-to-peer graph to listen on, dwScope specifies the IPv6 scope to listen on, dwScopeId specifies the IPv6 scope ID to listen on, wPort specifies the port to listen on.

```
    HRESULT WINAPI PeerGraphConnect(
        IN HGRAPH        hGraph,
        IN PCWSTR        pwzPeerId,
        IN PPEER_ADDRESS pAddress,
        OUT ULONGLONG *  pullConnectionId);
``` where hGraph is the handle of the peer-to-peer graph, pwzPeerId specifies the unique ID of a peer to connect to at pAddress, pAddress is a pointer to a Peer_Address structure that identifies the node to connect to, and pullConnectionId receives the pointer to a ULONGLONG that contains the connection ID.

```
    HRESULT WINAPI PeerGraphClose(
        IN HGRAPH   hGraph);
``` where hGraph is the handle to the peer-to-peer graph to close.

```
    HRESULT WINAPI PeerGraphGetRecord(
        IN HGRAPH        hGraph,
        IN GUID *        pRecordId,
        OUT PPEER_RECORD * ppRecord);
``` where hGraph is a handle to the peer-to-peer graph, pRecordId is a pointer to record ID to retrieve, and ppRecord receives the requested record.

```
    HRESULT WINAPI PeerGraphAddRecord(
        IN HGRAPH        hGraph,
        IN PPEER_RECORD  pRecord,
        OUT GUID *       pRecordId);
``` where hGraph is the handle to the peer-to-peer graph, pRecord is a pointer to the record to add, and pRecordId specifies the record ID that uniquely identifies this record in a peer-to-peer graph.

```
    HRESULT WINAPI PeerGraphDeleteRecord(
        IN HGRAPH   hGraph,
        IN GUID *   pRecordId,
        IN BOOL     fLocal);
``` where hGraph is the handle to the peer-to-peer graph, pRecordId is a pointer to record ID to delete, and fLocal is a flag.

```
    HRESULT WINAPI PeerGraphRegisterEvent(
        IN HGRAPH    hGraph,
        IN HANDLE    hEvent,
        IN ULONG     cEventRegistrations,
        IN PPEER_GRAPH_EVENT_REGISTRATION
                     pEventRegistrations,
        OUT HPEEREVENT * phPeerEvent);
``` where hGraph is the handle to the peer-to-peer graph, hEvent is the handle that the application is signaled on when an event is triggered, cEventRegistrations specifies the number of PEER_GRAPH_EVENT_REGISTRATION structures in pEventRegistrations, pEventRegistrations points to an array of PEER_GRAPH_EVENT_REGISTRATION structures that specify what events the application requests notifications for phPeerEvent receives a HPEEREVENT handle.

```
    typedef enum peer_graph_event_type_tag
    {
        PEER_GRAPH_EVENT_STATUS_CHANGED,
        PEER_GRAPH_EVENT_PROPERTY_CHANGED,
        PEER_GRAPH_EVENT_RECORD_CHANGED,
        PEER_GRAPH_EVENT_DIRECT_CONNECTION,
        PEER_GRAPH_EVENT_NEIGHBOR_CONNECTION,
        PEER_GRAPH_EVENT_INCOMING_DATA,
        PEER_GRAPH_EVENT_CONNECTION REQUIRED,
        PEER_GRAPH_EVENT_NODE_CHANGED,
        PEER_GRAPH_EVENT_SYNCHRONIZED
    } PEER_GRAPH_EVENT_TYPE;
``` where PEER_GRAPH_EVENT_STATUS_CHANGED indicates that the peer-to-peer graph status has changed in some manner, PEER_GRAPH_EVENT_PROPERTY_CHANGED indicates that a field in the peer-to-peer graph property structure has changed, PEER_GRAPH_EVENT_RECORD_CHANGED indicates that a record type or specific record has changed in some manner, PEER_GRAPH_EVENT_DIRECT_CONNECTION indicates that a peer's direct connection has changed, PEER_GRAPH_EVENT_NEIGHBOR_CONNECTION indicates that a connection to a peer neighbor has changed, PEER_

GRAPH_EVENT_INCOMING_DATA indicates that data has been received from a direct or neighbor connection, PEER_GRAPH_EVENT_CONNECTION_REQUIRED indicates that the peer-to-peer graph has become unstable, PEER_GRAPH_EVENT_NODE_CHANGED indicates that a node's presence status has changed in the peer-to-peer graph, and PEER_GRAPH_EVENT_SYNCHRONIZED indicates that a specific record type has been synchronized.

```
HRESULT WINAPI PeerGroupCreate(
    IN PPEER_GROUP_PROPERTIES pProperties,
    OUT HGROUP     * phGroup);
``` where pProperties is a pointer to a PEER_GROUP_PROPERTIES structure that specifies the specific details of the group, such as the peer-to-peer group names, invitation lifetimes, and presence lifetimes, and phGroup returns the handle pointer to the peer-to-peer group.

```
HRESULT WINAPI PeerGroupJoin(
    IN PCWSTR      pwzIdentity,
    IN PCWSTR      pwzInvitation,
    IN PCWSTR      pwzCloud,
    OUT HGROUP     * phGroup);
``` where pwzIdentity is a pointer to a Unicode string that contains the identity that a peer uses to join a peer-to-peer group, pwzInvitation is a pointer to a Unicode string that contains the XML invitation granted by another peer, pwzCloud is a pointer to a Unicode string that contains the name of the PNRP cloud where a group is located, and phGroup is a pointer to the handle of the peer-to-peer group.

```
HRESULT WINAPI PeerGroupConnect(
    IN HGROUP     hGroup);
``` where hGroup is the handle to the peer-to-peer group to which a peer intends to connect.

```
HRESULT WINAPI PeerGroupClose(
    IN HGROUP     hGroup);
``` where hGroup is the handle to the peer-to-peer group to close.

```
HRESULT WINAPI PeerGroupDelete(
    IN PCWSTR  pwzIdentity,
    IN PCWSTR  pwzGroupPeerName);
``` where pwzIdentity is a pointer to a Unicode string that contains the identity opening the specified peer-to-peer group, and pwzGroupPeerName is a pointer to a Unicode string that contains the peer name of the peer-to-peer group whose data is deleted.

```
HRESULT WINAPI PeerGroupCreateInvitation(
    IN HGROUP        hGroup,
    IN PCWSTR        pwzIdentityInfo,
    IN FILETIME *    pftExpiration,
    IN ULONG         cRoles,
    IN PEER_ROLE_ID* pRoles,
    OUT PWSTR        * ppwzInvitation);
``` where hGroup is the handle to the peer-to-peer group for which this invitation is issued, pwzIdentityInfo is a pointer to a Unicode string that contains the XML blob (including the GMC) returned by a previous call to PeerIdentityGetXML with the identity of the peer, pftExpiration specifies a UTC FILETIME structure that contains the specific date and time the invitation expires, cRoles specifies the count of roles in pRoleInfo, pRoles is a pointer to a list of GUIDs that specifies the combined set of available roles, and ppwzInvitation is a pointer to a Unicode string that contains the invitation from the issuer.

```
HRESULT WINAPI PeerGroupRegisterEvent(
    IN HGROUP                hGroup,
    IN HANDLE                hEvent,
    IN DWORD                 cEventRegistration,
    IN PPEER_GROUP_EVENT_REGISTRATION
                             pEventRegistrations,
    OUT HPEEREVENT * phPeerEvent);
``` where hGroup is the handle of the peer-to-peer group on which to monitor the specific peer events; hEvent is a pointer to a Windows event handle, which is signaled when a peer event is fired; cEventRegistration contains the number of PEER_GROUP_EVENT_REGISTRATION structures listed in pEventRegistrations; pEventRegistrations is a pointer to a list of PEER_GROUP_EVENT_REGISTRATION structures that contains the peer event types for which registration occurs; and phPeerEvent is a pointer to the returned HPEEREVENT handle.

```
typedef enum peer_group_event_type_tag
{
    PEER_GROUP_EVENT_STATUS_CHANGED,
    PEER_GROUP_EVENT_PROPERTY_CHANGED,
    PEER_GROUP_EVENT_RECORD_CHANGED,
    PEER_GROUP_EVENT_DIRECT_CONNECTION,
    PEER_GROUP_EVENT_NEIGHBOR_CONNECTION,
    PEER_GROUP_EVENT_INCOMING_DATA,
    PEER_GROUP_EVENT_MEMBER_CHANGED,
    PEER_GROUP_EVENT_CONNECTION_FAILED
} PEER_GROUP_EVENT_TYPE;
``` where PEER_GROUP_EVENT_STATUS_CHANGED indicates that the status of the group has changed, PEER_GROUP_EVENT_PROPERTY_CHANGED indicates that a member in the PEER_GROUP_PROPERTIES structure has changed, PEER_GROUP_EVENT_RECORD_CHANGED indicates that a group record has changed, PEER_GROUP_EVENT_DIRECT_CONNECTION indicates that the status of a direct connection has changed, PEER_GROUP_EVENT_NEIGHBOR_CONNECTION indicates that the status of a neighbor connection has changed, PEER_GROUP_EVENT_INCOMING_DATA indicates that an incoming direct connection data from a member is detected, PEER_GROUP_EVENT_MEMBER_CHANGED indicates that the status of a member has changed, and PEER_GROUP_EVENT_CONNECTION_FAILED indicates that the connection to the peer-to-peer group has failed.

```
HRESULT WINAPI PeerGroupGetRecord(
    IN HGROUP    hGroup,
    IN GUID *    pRecordId,
    OUT PPEER_RECORD * ppRecord);
``` where hGroup is a handle to a group that contains a specific record, pRecordId specifies the GUID value that uniquely identifies a required record within a peer-to-peer group, and ppRecord is a pointer to the address of a PEER_RECORD structure that contains a returned record.

```
HRESULT WINAPI PeerGroupAddRecord(
    IN HGROUP    hGroup,
    IN PPEER_RECORD pRecord,
    OUT GUID     * pRecordId);
``` where hGroup is the handle to the peer-to-peer group, pRecord is a pointer to a PEER_RECORD structure that is added to the peer-to-peer group specified in hGroup, and pRecordId is a pointer to a GUID that identifies the record.

```
HRESULT WINAPI PeerGroupDeleteRecord(
    IN HGROUP    hGroup,
    IN GUID *    pRecordId);
``` where hGroup is thehandle to the peer-to-peer group that contains the record and PRecordId, specifies the GUID value that uniquely identifies the record to be deleted.

A process for collaborating and communicating real-time in a peer-to-peer network has been described. Scenarios such as instant messaging, collaboration on documents, images, etc., collaborative gaming, whiteboarding, on-line business presentations, and the like.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of communicating between nodes in a peer-to-peer network to enable a user to do at least one of collaboration and real-time communication with users on other nodes in the peer-to-peer network, the method comprising the steps of:
   creating a graph by calling a PeerGraphCreate function;
   listening for incoming connections by calling a PeerGraphListen function;
   sending an identifier of the graph to the other nodes;
   registering for events of interest by calling a PeerGraphRegisterEvent function;
   capturing data corresponding to the at least one of collaboration and real-time communication; and
   adding a record that contains one of a link to the data and the data using the PeerGraphAddRecord function, thereby propagating the record to the other nodes.

2. The method of claim 1 further comprising the step of updating the record when the at least one of collaboration and real-time communication changes.

3. The method of claim 1 wherein the at least one of collaboration and real-time communication comprises collaboration and wherein the step of capturing data includes the step of capturing movement of an object on a whiteboard.

4. The method of claim 3 wherein the step of capturing movement of an object on a whiteboard includes the step of capturing position coordinates of a line being drawn on the whiteboard.

5. The method of claim 1 wherein the at least one of collaboration and real-time communication comprises real-time communication and wherein the step of capturing data includes the step of capturing text.

6. The method of claim 1 further comprising the step of deleting data in the record by calling a PeerGraphDeleteRecord function.

7. The method of claim 1 further comprising the step of deleting the data by calling the PeerGraphAddRecord function to add a new Record and wherein the data in the new Record cancels the data in the Record.

8. The method of claim 1 further comprising the steps of:
   by each of the other nodes:
      opening the graph by calling a PeerGraphOpen function; and
      connecting to the node by calling a PeerGraphConnect function.

9. The method of claim 8 further comprising the step of getting the record by calling a PeerGraphGetRecord function.

10. The method of claim 1 further comprising the step of closing the graph by calling the PeerGraphClose function.

11. The method of claim 1 further comprising the step of closing the group by calling the PeerGroupClose function.

12. A method of communicating between nodes in a peer-to-peer network to enable a user to do at least one of collaboration and real-time communication with users on other nodes in the peer-to-peer network, the method comprising the steps of:
   creating a group by calling a PeerGroupCreate function;
   calling a PeerGroupConnect function;
   registering for events of interest by calling a PeerGroupRegisterEvent function;
   capturing data corresponding to the at least one of collaboration and real-time communication; and
   adding a record that contains one of a pointer to the data and the data using the PeerGroupAddRecord function, thereby propagating the record to the other nodes.

15

13. The method of claim 12 further comprising the step of updating the record when the at least one of collaboration and real-time communication changes.

14. The method of claim 12 wherein the at least one of collaboration and real-time communication comprises collaboration and wherein the step of capturing data includes the step of capturing movement of an object on a whiteboard.

15. The method of claim 14 wherein the step of capturing movement of an object on a whiteboard includes the step of capturing position coordinates of a line being drawn on the whiteboard.

16. The method of claim 12 wherein the at least one of collaboration and real-time communication comprises real-time communication and wherein the step of capturing data includes the step of capturing text.

17. The method of claim 12 further comprising the step of deleting data in the record by calling a PeerGroupDeleteRecord function.

18. The method of claim 12 further comprising the step of deleting the data by calling the PeerGroupAddRecord function to add a new Record and wherein the data in the new Record cancels the data in the Record.

19. The method of claim 12 further comprising the steps of:
by each of the other nodes:
joining the group by calling a PeerGroupJoin function; and
connecting to the group by calling a PeerGroupConnect function.

20. The method of claim 19 further comprising the step of getting the record by calling a PeerGroupGetRecord function.

21. The method of claim 12 further comprising the steps of:
inviting users on other nodes to join the group by calling the PeerGroupCreateInvitation function; and
sending an invitation created by the PeerGroupCreateInvitation function to another node.

22. The method of claim 21 further comprising the steps of:
by each other node:
calling a PeerGroupIdentityGetInfo function to obtain information for joining the group;
sending the information to the node to provide the node data for the PeerGroupCreateInvitation function.

23. A computer storage medium having computer-executable instructions for communicating between nodes in a peer-to-peer network to enable a user to do at least one of collaboration and real-time communication with users on other nodes in the peer-to-peer network, the computer-executable instructions for performing the steps comprising:
creating a graph by calling a PeerGraphCreate function;
listening for incoming connections by calling a PeerGraphListen function;
sending an identifier of the graph to the other nodes;
registering for events of interest by calling a PeerGraphRegisterEvent function;
capturing data corresponding to the at least one of collaboration and real-time communication; and
adding a record that contains one of a link to the data and the data using the PeerGraphAddRecord function, thereby propagating the record to the other nodes.

24. The computer storage medium of claim 23 having further computer-executable instructions for performing the step comprising updating the record when the at least one of collaboration and real-time communication changes.

25. The computer storage medium of claim 23 wherein the at least one of collaboration and real-time communication

16 comprises collaboration and wherein the step of capturing data includes the step of capturing movement of an object on a whiteboard.

26. The computer storage medium of claim 25 wherein the step of capturing movement of an object on a whiteboard includes the step of capturing position coordinates of a line being drawn on the whiteboard.

27. The computer storage medium of claim 23 wherein the at least one of collaboration and real-time communication comprises real-time communication and wherein the step of capturing data includes the step of capturing text.

28. The computer storage medium of claim 23 having further computer-instructions for performing the step comprising deleting data in the record by calling a PeerGraphDeleteRecord function.

29. The computer storage medium of claim 23 having further computer-instructions for performing the step comprising deleting the data by calling the PeerGraphAddRecord function to add a new Record and wherein the data in the new Record cancels the data in the Record.

30. The computer storage medium of claim 23 having further computer-instructions for performing the steps comprising:
by each of the other nodes:
opening the graph by calling a PeerGraphOpen function; and
connecting to the node by calling a PeerGraphConnect function.

31. The computer storage medium of claim 30 having further computer-instructions for performing the step comprising getting the record by calling a PeerGraphGetRecord function.

32. The computer storage medium of claim 23 having further computer-instructions for performing the step comprising closing the graph by calling the PeerGraphClose function.

33. A computer storage medium having computer-executable instructions for communicating between nodes in a peer-to-peer network to enable a user to do at least one of collaboration and real-time communication with users on other nodes in the peer-to-peer network, the computer-executable instructions performing the steps comprising:
creating a group by calling a PeerGroupCreate function;
calling a PeerGroupConnect function;
registering for events of interest by calling a PeerGroupRegisterEvent function;
capturing data corresponding to the at least one of collaboration and real-time communication; and
adding a record that contains one of a pointer to the data and the data using the PeerGroupAddRecord function, thereby propagating the record to the other nodes.

34. The computer storage medium of claim 33 having further computer-instructions for performing the step comprising updating the record when the at least one of collaboration and real-time communication changes.

35. The computer storage medium of claim 33 wherein the at least one of collaboration and real-time communication comprises collaboration and wherein the step of capturing data includes the step of capturing movement of an object on a whiteboard.

36. The computer storage medium of claim 35 wherein the step of capturing movement of an object on a whiteboard includes the step of capturing position coordinates of a line being drawn on the whiteboard.

37. The computer storage medium of claim 33 wherein the at least one of collaboration and real-time communication comprises real-time communication and wherein the step of capturing data includes the step of capturing text.

38. The computer storage medium of claim 33 having further computer-instructions for performing the step comprising deleting data in the record by calling a PeerGroupDeleteRecord function.

39. The computer storage medium of claim 33 having further computer-instructions for performing the step comprising deleting the data by calling the PeerGroupAddRecord function to add a new Record and wherein the data in the new Record cancels the data in the Record.

40. The computer storage medium of claim 33 having further computer-instructions for performing the steps comprising:
by each of the other nodes:
joining the group by calling a PeerGroupJoin function; and
connecting to the group by calling a PeerGroupConnect function.

41. The computer storage medium of claim 40 further comprising the step of getting the record by calling a PeerGroupGetRecord function.

42. The computer storage medium of claim 33 having further computer-instructions for performing the step comprising closing the group by calling the PeerGroupClose function.

43. The computer storage medium of claim 33 having further computer-instructions for performing the steps comprising:
inviting users on other nodes to join the group by calling the PeerGroupCreateInvitation function; and
sending an invitation created by the PeerGroupCreateInvitation function to another node.

44. The computer storage medium of claim 43 having further computer-instructions for performing the steps comprising:
by each other node:
calling a PeerGroupIdentityGetInfo function to obtain information for joining the group;
sending the information to the node to provide the node data for the PeerGroupCreateInvitation function.

* * * * *